Nov. 29, 1932.　　　　B. L. HENRY　　　　1,889,657
DUPLICATING DEVICE FOR TYPEWRITING MACHINES
Filed Dec. 3, 1928　　　7 Sheets-Sheet 1
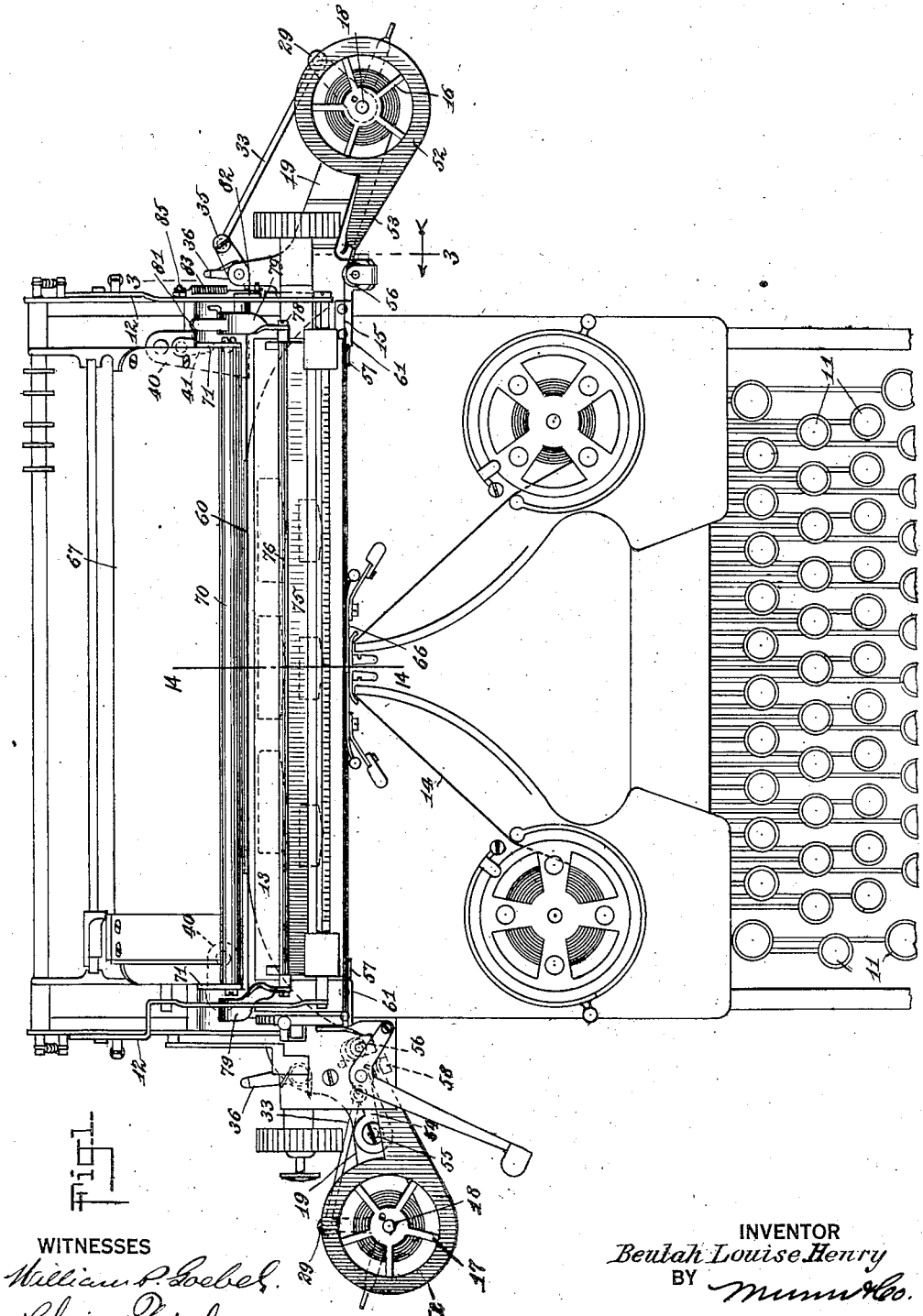
WITNESSES
INVENTOR
Beulah Louise Henry
BY
ATTORNEY

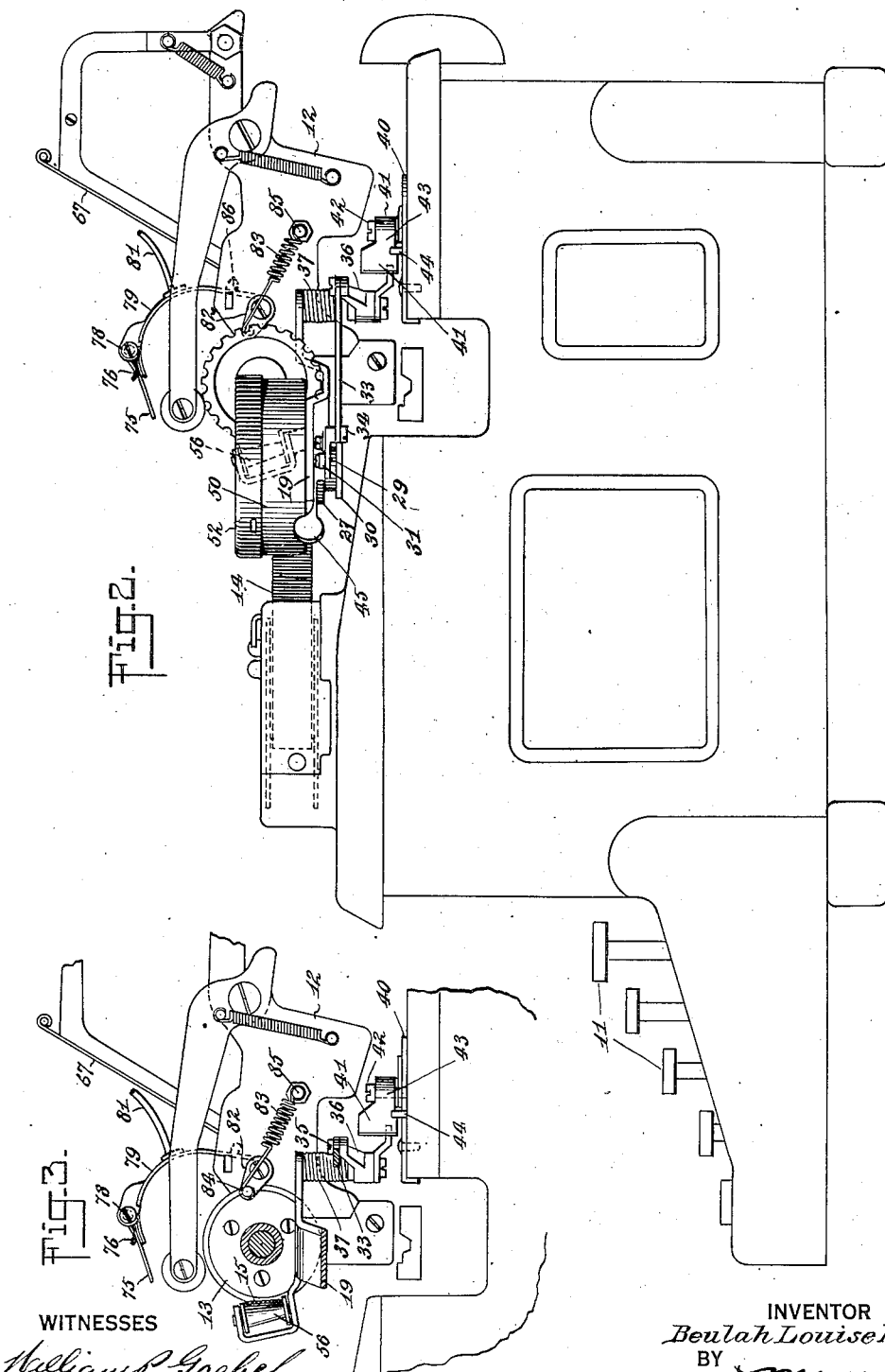

Nov. 29, 1932.  B. L. HENRY  1,889,657
DUPLICATING DEVICE FOR TYPEWRITING MACHINES
Filed Dec. 3, 1928  7 Sheets-Sheet 3

WITNESSES

INVENTOR
Beulah Louise Henry
BY
ATTORNEY

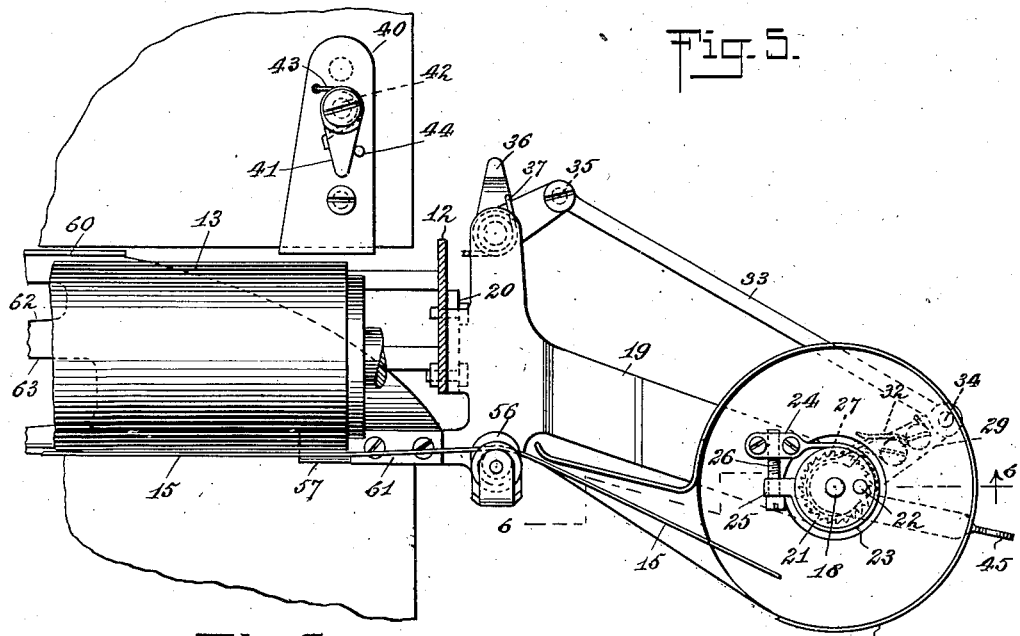
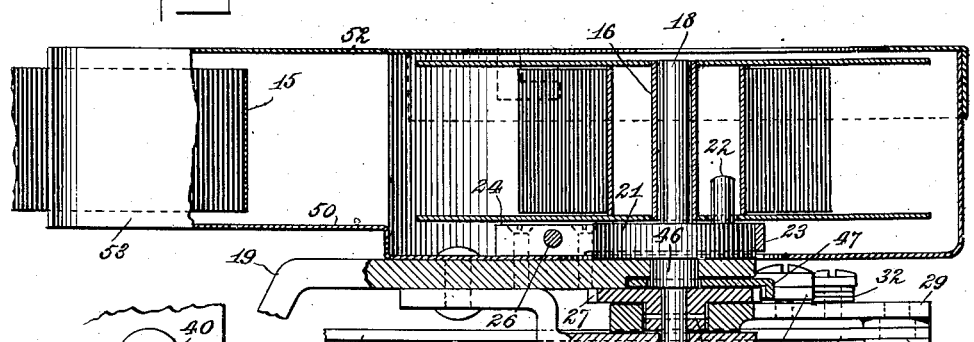
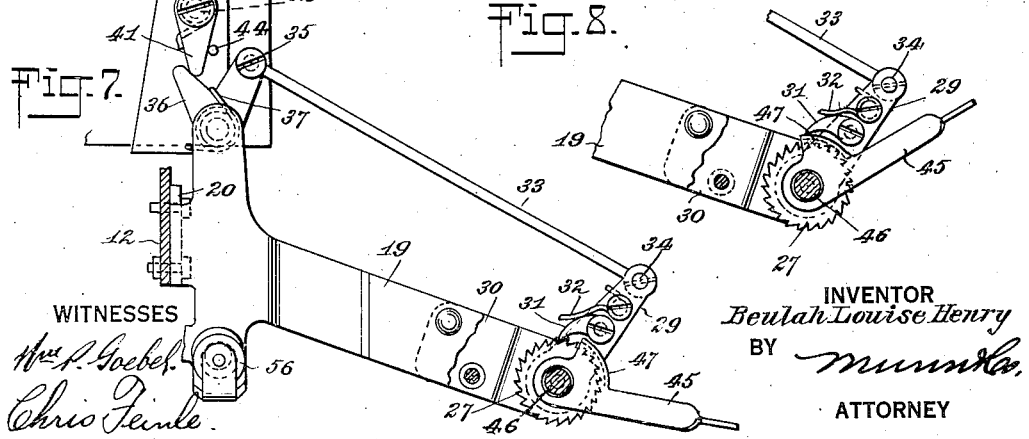

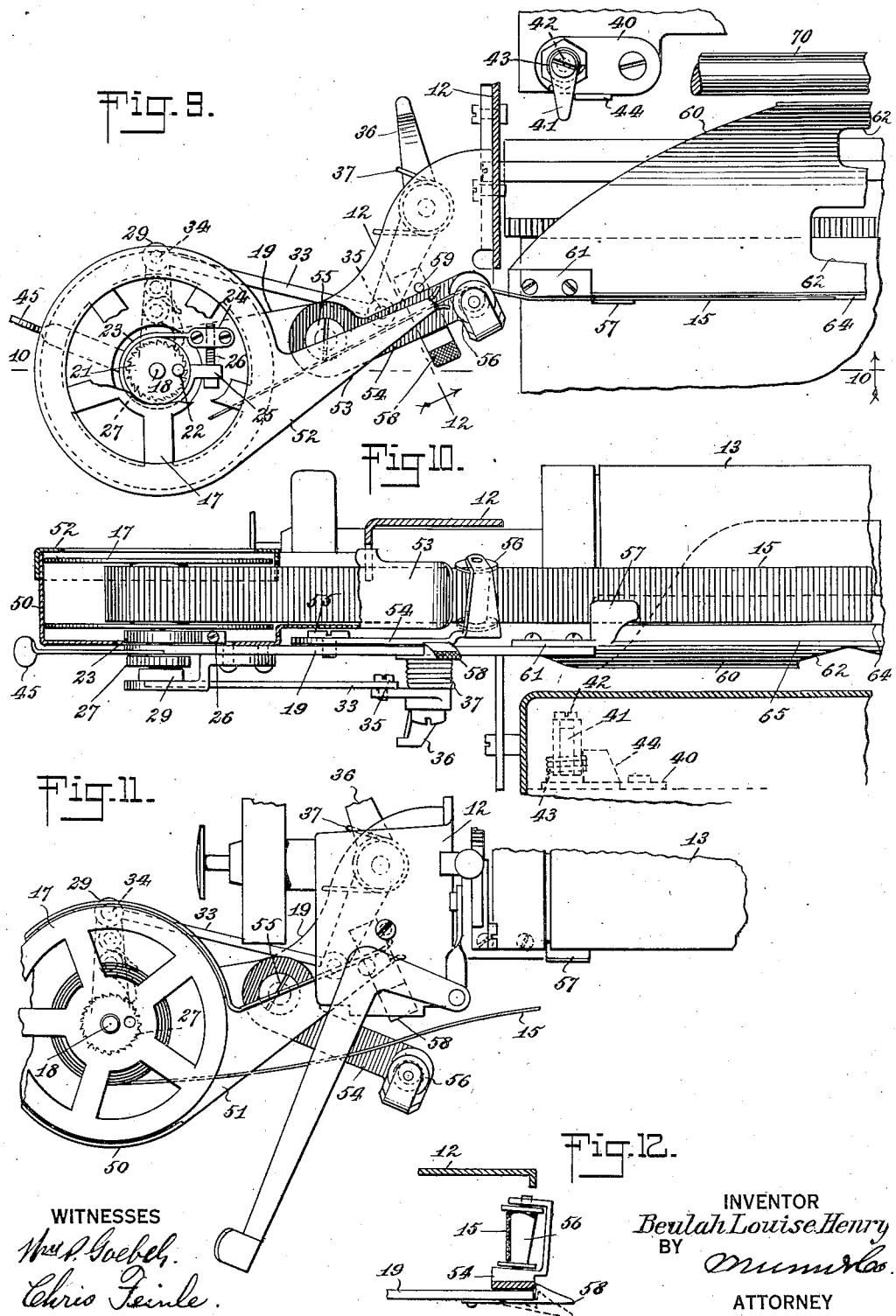

Nov. 29, 1932.   B. L. HENRY   1,889,657
DUPLICATING DEVICE FOR TYPEWRITING MACHINES
Filed Dec. 3, 1928    7 Sheets-Sheet 6
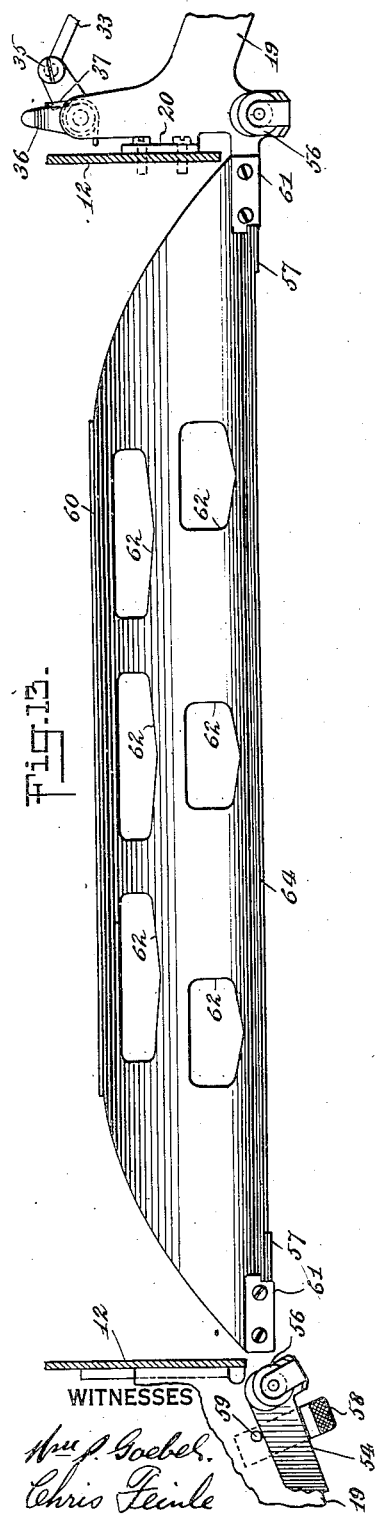
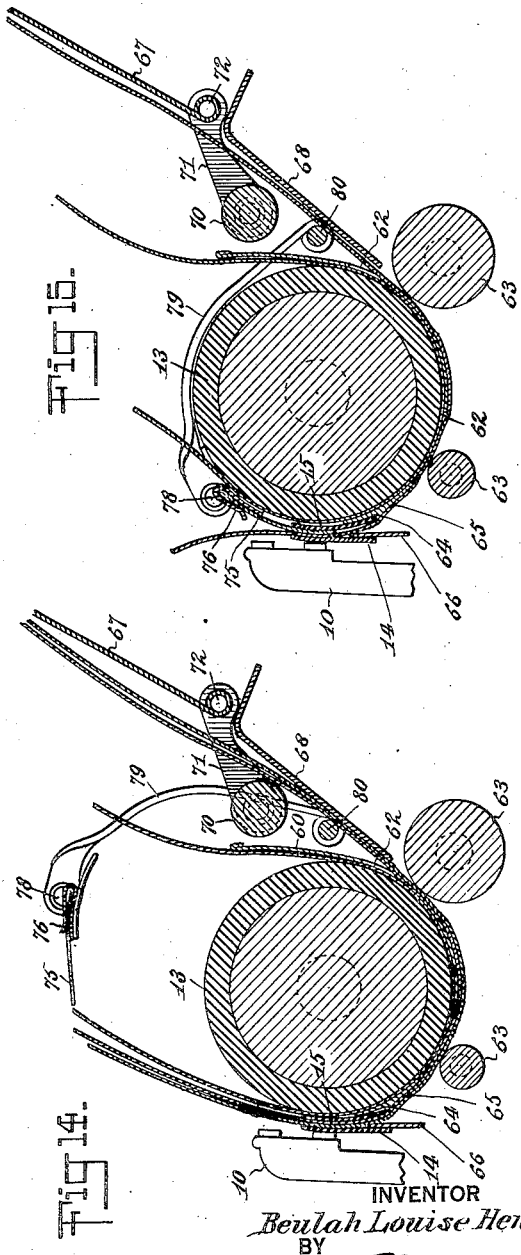
INVENTOR
Beulah Louise Henry
BY
ATTORNEY

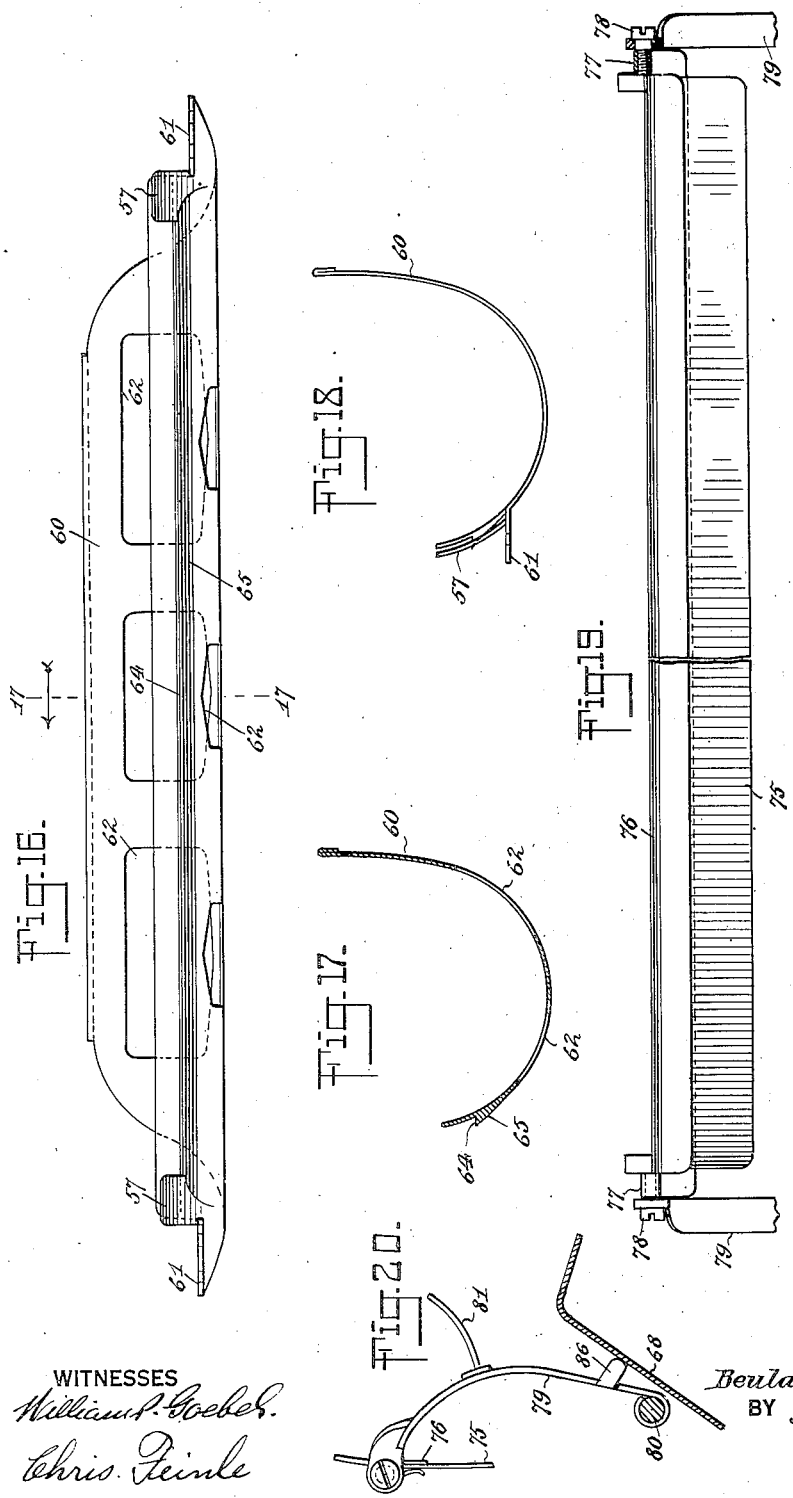

Patented Nov. 29, 1932

1,889,657

UNITED STATES PATENT OFFICE

BEULAH LOUISE HENRY, OF NEW YORK, N. Y., ASSIGNOR OF ONE-HALF TO EDWIN A. GUINZBURG, OF NEW YORK, N. Y.

DUPLICATING DEVICE FOR TYPEWRITING MACHINES

Application filed December 3, 1928. Serial No. 323,346.

This invention relates to typewriting machines designed and adapted to make two or more original typewritten copies, or in other words, to make two or more copies simultaneously without the use of carbon paper.

One of the objects of the invention is to provide in a typewriting machine of the indicated character, means of improved construction for supporting and feeding an auxiliary or extra ink-ribbon, and also to make it easy to put said ribbon into the machine and for removing the same therefrom whenever the occasion arises.

Another object is to provide in a typewriting machine of the indicated character means of improved construction for guiding the additional sheets of paper to their proper positions with respect to the ink-ribbons and platen.

Another object of the invention is the provision in a typewriting machine of the indicated character, means of improved construction to prevent type impressions being made on two sheets of paper by one ribbon, to the end that two or more original typewritten copies may be made simultaneously at the will of the typist.

The nature of the invention and its distinguishing features and advantages will appear when the following specification is read in connection with the accompanying drawings, in which—

Figure 1 is a plan view of a typewriting machine with the improvement applied thereto, the machine being shown conventionally.

Fig. 2 is a side view.

Fig. 3 is a sectional view taken on the line 3—3, of Fig. 1.

Fig. 5 is an enlarged plan view illustrating certain features of the right hand extra ink-ribbon spool operating means, the spool and spool case cover being removed.

Fig. 6 is a sectional view taken on the line 6—6, of Fig. 5, the spool and cover being shown.

Fig. 7 is a plan view showing certain features of the spool operating means shown in Fig. 5, the parts being shown about to rotate the ratchet wheel connected with the spool.

Fig. 8 is a detail plan view of the ratchet wheel and pawl shown in Fig. 7, with the pawl control lever in a position to cause the pawl to idle.

Fig. 9 is an enlarged sectional plan view illustrating certain features of the left hand extra ink-ribbon spool operating means, a portion of the spool being broken away, and also illustrating a portion of the platen carriage with the platen removed.

Fig. 10 is a sectional view taken on the line 10—10, of Fig. 9.

Fig. 11 is a plan view illustrating certain features of the left hand extra ink-ribbon spool operating means, the spool case cover being removed, and the ribbon guide roller swung out of its guiding position.

Fig. 12 is a detail section taken on the line 12—12, of Fig. 9.

Fig. 13 is a plan view of the sheet guide.

Fig. 14 is an enlarged transverse sectional view taken on the line 14—14, of Fig. 1, and showing the relation of the ink-ribbons, three sheets of paper and the platen for typing three original copies.

Fig. 15 is a view similar to Fig. 14, but showing the relation of the ink-ribbons, two sheets of paper, the platen and type impression intercepting means, for typing two original copies.

Fig. 16 is a front view of the sheet guide which cooperates with the platen.

Fig. 17 is a transverse sectional view taken on the line 17—17, of Fig. 16.

Fig. 18 is an end view of the sheet guide shown in Fig. 16.

Fig. 19 is a front view of the type impression intercepting means partly in section.

Fig. 20 is an end view of the intercepting means in its inactive position.

Figure 4:
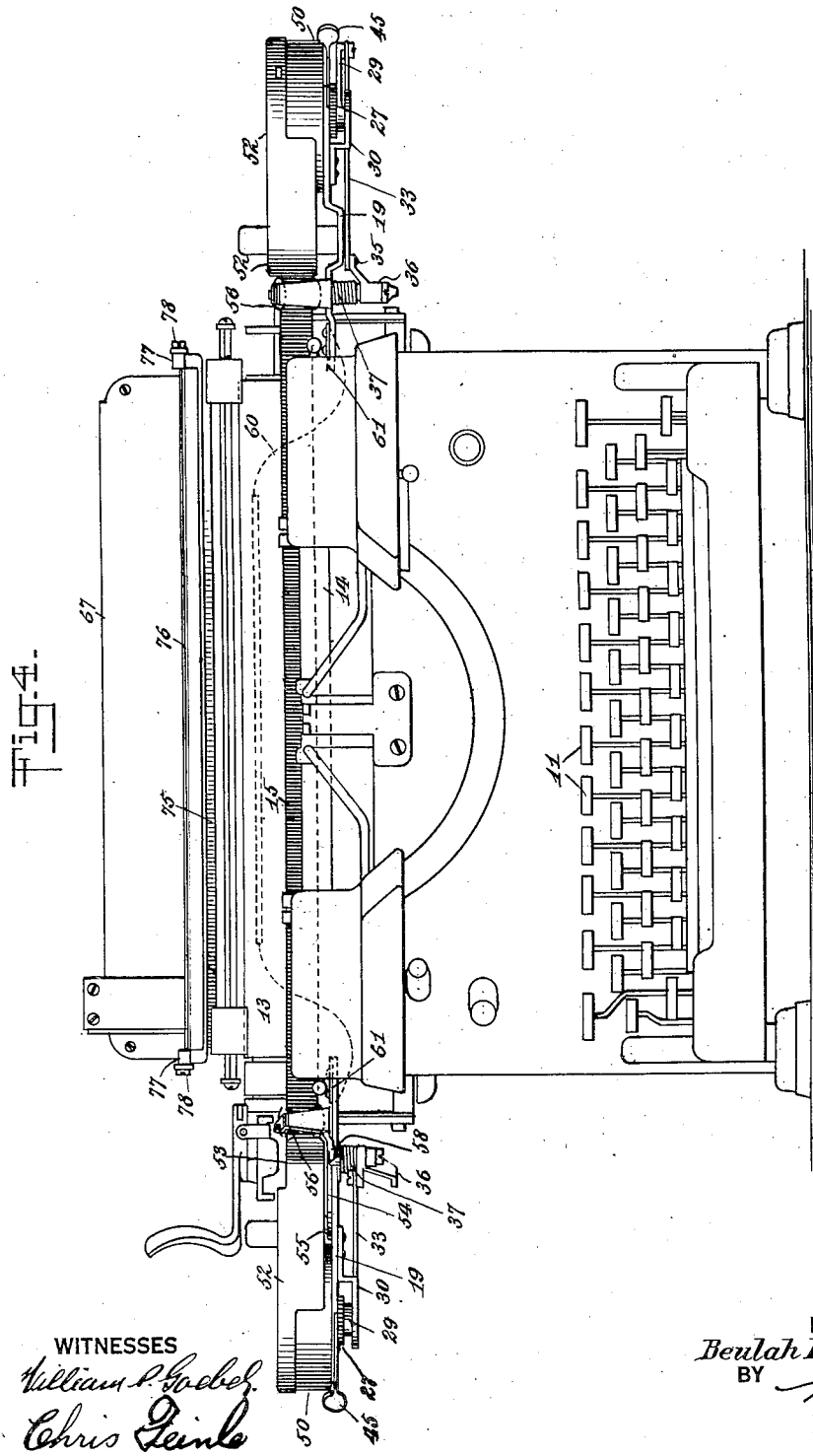
Fig. 4 is a front view.

The present invention contemplates the combination of means hereinafter to be fully described, and a typewriting machine of standard construction and operation without alteration to any of its parts.

The typewriting machine will include the usual typing mechanism, including type bars 10 and their keys 11; platen carriage 12, platen on said carriage; the usual ink-ribbon 14 with mechanism to feed said ribbon as the carriage is moved back and forth; and line spacing mechanism which operates in conjunction with the platen and sheet guiding and feeding means.

In accordance with the invention there is provided an auxiliary or extra ink ribbon 15 wound on spools 16 and 17. Each of the spools 16 and 17 is freely rotatable on an arbor 18 carried by a bracket 19, rigidly attached as at 20 to one end of the carriage 12. The arbor 18 is provided with a brake disk 21 which rests on the upper face of the bracket 19. The disk 21 has an upstanding pin 22 receivable in either one of the holes respectively in the flanges of the spool. A brake band 23 coacts with the disk 21. One end of the band is attached to the bracket as at 24, and the opposite end thereof is provided with a lug 25. A tensioning screw 26 extends through the lug 25 and is threaded in the opposite attached end 24 of the band. It will therefore be understood that there is provided means for keeping the ribbon 15 under proper tension, or in other words for holding the same taut disposed along the printing line of the platen 13. A ratchet wheel 27 is pinned to the arbor 18 as at 28. An arm 29 loosely surrounds the hub of the ratchet wheel 27 and rests on a small bracket 30 attached to the under side of the bracket 19. A pawl 31 having pivotal movement is arranged on the arm 29 to coact with the teeth of the ratchet wheel 27. The pawl 31 is under the influence of a spring 32 carried by the arm 29. The spring 32 has a normal tendency to move the pawl 31 into engagement with the teeth of the ratchet wheel 27. A rod 33 has one end thereof pivotally connected with the free end of the arm 29 as at 34, and the opposite end of said rod 33 is pivotally connected as at 35 with a bell crank lever 36 carried by an extension on the bracket 19. The lever 36 is under the influence of a coil spring 37 which serves to return the lever 36, rod 33 and arm 29 to their normal positions. A plate 40 is attached to the frame of the machine. A trip 41 is pivotally mounted as at 42 on the plate 40, and is under the influence of a coil spring 43. A stop 44 is also arranged on the plate 40. The spring 43 has a normal tendency to move the trip 41 into engagement with the stop 44, the latter serving to limit the movement of the trip 41 to be encountered by the lever 36 when the carriage 12 moves from left to right. This will cause the ribbon 15 to be moved one degree, as will be understood. When the carriage 12 moves from right to left, the lever 36 will encounter the trip 41 and the latter will move against the action of the spring 43, the lever 36 clearing the trip 41 without causing movement of the ribbon 15. A lever 45 loosely surrounds a hub 46 on the arbor 18, and said hub 46 serves as a fulcrum therefor. The lever 45 has a cam 47. When the lever 45 is in one position, the pawl 31 may cooperate with the teeth of the ratchet wheel 27 to cause the ribbon 15 to be wound on the related spool, as shown in Fig. 7, and when said lever 45 is in its other position, the cam 47 will hold the pawl in an inactive position, as shown in Fig. 8, in which it will idle on the cam as the carriage 12 moves back and forth. Consequently the ribbon 15 will not be caused to wind on the spool 16. The positions of the levers 45 will at all times be reversed so that when the ribbon 15 is being caused to wind for instance on the right hand spool 16, it will be caused to unwind from the left hand spool 17, and vice versa in the movement of the carriage 12 back and forth.

Each of the spools 16 and 17 is enclosed by a box or case 50 on the related bracket 19. The case 50 is open at the front as at 51. The case 50 has a cover 52 which is removable by virtue of bayonet slot connections. The cover 50 has an extension 53 which is disposed in the opening 51 when the cover is in place, and said extension 53 serves as a guide for the ribbon 15. An arm 54 is pivotally connected as at 55 with left bracket 19, and the outer end of the arm 54 carries a guide roller 56. The guide roller 56 cooperates with the guide 53 and a fixed guide 57 at one end of the carriage 12 adjacent the platen 13. In this manner the ribbon 15 is held in side by side spaced relation to the ribbon 14 parallel to and in registry with the printing line of the platen 13. One guide roller 56 is held in contact with the ribbon 15 by the provision of a spring latch 58 connected with the related bracket 19 and engageable with the arm 54. By bearing down on the latch 58 with the thumb, the arm 54 and its roller 56 may be swung outwardly as shown most clearly in Fig. 11. This will readily enable the spools 16 and 17 to be put into place when the covers 52 of the cases 50 are removed, and also to allow the ribbon 15 to be readily placed in the guides.

In order to guide the sheets of paper and also to aid in properly supporting the extra ink ribbon 15 there is provided means in the form of a curved flexible metal plate 60 shown most clearly in Figs. 13 and 16 to 18 inclusive. The plate 60 has the opposite ends thereof attached to extensions respectively on the brackets 19 as at 61. The plate 60 has openings 62 therein which respectively receive pressure rolls 63 on the carriage 12. The rolls 63 cooperate with the platen 13 to impart movement to the sheets in the rotation of the platen 13. The plate 60 has a ledge 64 which extends the entire length of the front end of the plate and slightly below its upper edge on which the lower edge of the ribbon 15 rests. The ledge 64 also presents means in the form of an inclined surface 65 which serves as a sheet deflector disposed below the usual sheet holding plate 66 of the machine. The machine also includes the usual paper guide rests 67 and 68 on the carriage 12. A guide roll 70 is supported by arms 71 loosely connected respectively with the opposite ends of the roll 70 and pivotally connected as at 72 with the lower end of the rest plate 67.

From the foregoing it will be apparent that when it is desired to make three original typewritten copies simultaneously in the usual operation of the keys 11, three sheets of paper are arranged as follows, namely, two sheets are arranged between the roll 70 and the plate 68 guided both by the plate 67 and plate 68, to be disposed outside of the plate 60. By rotating the platen 13 in the usual manner these sheets will be gripped between the platen 13 and the first set of rolls 63. A third sheet is placed in front of the rear end of the plate 60 and the platen 13. The platen 13 is then rotated which will cause the three sheets to follow around with the platen 13, and one sheet will be disposed between the extra ink-ribbon 14 and the platen, and the other two sheets will be deflected slightly by the means 65 and be brought between the two ribbons 14 and 15. The machine may then be operated in the usual manner, and as a result three original typewritten copies will be produced simultaneously. The typewriting will occur on the front faces of the first and third sheets, and on the rear face of the middle sheet, the type impressions being transferred thereto by the ribbon 15. It is to be understood that the middle or second sheet of paper is preferably of transparent material so that the typing thereon may be read through the paper, inasmuch as the typing will be reversed.

In order to produce two original typewritten copies with the ribbons 14 and 15 there is provided a protecting or intercepting means on the carriage 12 adapted to be swung into and out of registry with the printing line of the platen between the ribbons. The said means prevents type impressions being made on the back of one of the sheets of paper by one face of the extra ink-ribbon 15. The said means is in the form of a strip of suitable flexible and highly polished material, such as celluloid, the strip being designated 75 having the upper edge thereof clamped between a metal element 76. The opposite ends of the element 76 are provided respectively with lugs 77 having threaded bores in axial alinement with each other to receive arbor screws 78 respectively carried by the upper end of arms 79. The arms 79 are arranged on a horizontal rock shaft 80 positioned on the carriage 12. One of the arms 79 has a manipulator 81. One end of the shaft 80 has an arm 82. A coil spring 83 has one end thereof connected with the arm 82 as at 84 and the opposite end thereof is attached as at 85 to the adjacent end plate of the carriage 12. The spring 83 serves to hold the strip 75 in the inactive position as shown in Fig. 20, each arm 79 being provided with a lug 86 which engages the plate 68 to limit the movement thereof rearwardly. The spring 83 also serves to hold the strip 75 in the intercepting or protection position as shown in Fig. 15.

When it is desired to make two original typewritten copies simultaneously, two sheets of paper are arranged as follows, namely, one sheet is placed between the roll 70 and the plate 68 which brings it to the outside of the plate 60, and the second sheet is placed between the plate 60 and the platen 13. By rotating the platen 13 the sheets pass around with the platen 13 under the influence of the pressure rollers 63, and one sheet will be disposed between the ribbon 15 and the platen 13, and the other sheet will be deflected by the means 65 to a position between the ribbons 14 and 15. The strip 75 is then swung downwardly to a position between the first or outer sheet of paper and the front face of the ribbon 15. By operating the keys 11 in the usual manner typing will occur on the front faces of the two sheets. It will be apparent that the strip 75 intercepts the type impressions which would be transferred by the front face of the ribbon 15 to the rear face of the first or outer sheet of paper, thus protecting the latter, as shown most clearly in Fig. 15. It will be apparent that the character of the strip 75 is such that it may be readily wiped clean of any ink, and can be made thin enough for sharp and well defined type impressions being made on the second sheet of paper. It will also be apparent from Fig. 20, that the strip 75 in its inactive position will be disposed above the platen 13 so as not to obstruct the vision of the typist.

It is to be understood that the invention is not restricted to the precise arrangement of parts shown and described, as details of construction may be modified and rearranged without departing from the spirit of the invention, the scope of which is limited only by the terms of the appended claims.

I claim:

1. In a typewriting machine, the combination of a revoluble platen, pressure rolls which cooperate with the platen to impart movement to sheets of paper, a curved plate positioned with respect to said platen to guide said sheets around said platen, an ink-ribbon, said plate having a ledge to support a portion of said ribbon spaced from said platen disposed lengthwise and in registry with the typing line thereof, a second ink-ribbon having a portion spaced from the supported portion of the other ribbon, and said plate having means to deflect one or more of said sheets between said ribbon portions.

2. In a typewriting machine, the combination of a revoluble platen, pressure rolls which cooperate with the platen to impart movement to sheets of paper, a curved plate positioned with respect to said platen to guide said sheets around said platen, an ink-ribbon, said plate having a ledge slightly below the upper edge thereof to support a portion of said ribbon spaced from said platen disposed lengthwise and in registry with the typing line thereof, a second ink-ribbon having a portion spaced from the supported portion of the other ribbon, and said plate having means to deflect one or more of said sheets between said ribbon portions.

3. In a typewriting machine, the combination of a revoluble platen, pressure rolls which cooperate with the platen to impart movement to sheets of paper, a curved plate positioned with respect to said platen to guide said sheets around said platen, an ink-ribbon, said plate having a ledge to support a portion of said ribbon spaced from said platen disposed lengthwise and in registry with the typing line thereof, a second ink-ribbon having a portion spaced from the supported portion of the other ribbon, and said plate having an upwardly and forwardly inclined surface to deflect one or more of said sheets between said ribbon portions.

4. In a typewriting machine, the combination of a revoluble platen, pressure rolls which cooperate with the platen to impart movement to sheets of paper, a curved plate positioned with respect to said platen to guide said sheets around said platen, an ink-ribbon, said plate having a ledge to support a portion of said ribbon spaced from said platen disposed lengthwise and in registry with the typing line thereof, a second ink-ribbon having a portion spaced from the supported portion of the other ribbon, and said plate having an upwardly and forwardly inclined surface presented by said ledge to deflect one or more of said sheets between said ribbon portions.

5. In a typewriting machine, the combination of a revoluble platen, a curved plate positioned in relation to said platen to guide sheets around said platen, an ink-ribbon, said plate having a ledge to support a portion of said ribbon spaced from said platen disposed lengthwise and in registry with the typing line thereof, a second ink-ribbon having a portion spaced from the supported portion of the other ribbon, and said plate having means to deflect one or more of said sheets between said ribbon portions.

Signed at New York, in the county of New York and State of New York this 26th day of November, A. D. 1928.

BEULAH LOUISE HENRY.